United States Patent [19]
Hamada et al.

[11] Patent Number: 6,151,282
[45] Date of Patent: Nov. 21, 2000

[54] CLOCK MATCHING APPARATUS FOR A DATA REPRODUCTION SYSTEM

[75] Inventors: Kenichi Hamada; Satoshi Furuta, both of Hyogo; Masakazu Taguchi, Kawasaki; Toru Fujiwara, Hyogo, all of Japan

[73] Assignee: Fujitsu Limited, Kawasaki, Japan

[21] Appl. No.: 09/409,538

[22] Filed: Sep. 30, 1999

[30] Foreign Application Priority Data

Feb. 17, 1999 [JP] Japan .................................. 11-039113

[51] Int. Cl.⁷ ...................................................... G11B 5/09
[52] U.S. Cl. ........................ 369/48; 369/59; 369/124.05; 369/124.14
[58] Field of Search ................................. 369/59, 47, 48, 369/49, 124.01, 124.05, 124.14; 360/26, 27, 28, 51

[56] References Cited

U.S. PATENT DOCUMENTS

| | | | |
|---|---|---|---|
| 4,637,006 | 1/1987 | Bierhoff | 369/59 |
| 5,986,987 | 11/1999 | Taguchi et al. | 369/59 X |
| 5,995,465 | 11/1999 | Hayashi et al. | 369/59 |

FOREIGN PATENT DOCUMENTS 8087828  4/1996  Japan .

*Primary Examiner*—Paul W. Huber
*Attorney, Agent, or Firm*—Greer, Burns & Crain, Ltd.

[57] ABSTRACT

A clock matching apparatus for a data reproduction system includes a phase error detection unit which detects a phase error of a clock signal based on samples of a readout signal output by a sampler of the data reconstruction system. A phase-locked loop supplies a phase-matched clock signal to the sampler by compensating for the phase error detected by the phase error detection unit. The phase error detection unit includes an edge detection unit which detects a sampling instant for an edge sample among the samples of the readout signal. A difference unit generates a difference in timing phase between the edge sample and a sync level, the sync level being a reference signal level corresponding to a level of the readout signal at the sampling instants thereof and defined based on a partial-response waveform, the difference in the timing phase being output to the phase-locked loop as the detected phase error.

15 Claims, 12 Drawing Sheets

FIG. 7

| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
|---|---|---|---|---|---|---|---|---|---|---|---|---|---|
| $a_t$ (Yt≥CD1) | 0 | 0 | 0 | 0 | 0 | 1 | 1 | 1 | 0 | 0 | 0 | 0 | 0 |
| $b_t$ (Yt≥CD2) | 1 | 0 | 0 | 0 | 1 | 1 | 1 | 1 | 1 | 0 | 0 | 0 | 1 |
| $c_t$ (at EXOR bt) | 1 | 0 | 0 | 0 | 1 | 0 | 0 | 0 | 1 | 0 | 0 | 0 | 1 |
| $d_t$ (at EXOR at-1) | 1 | 1 | 0 | 0 | 0 | 1 | 0 | 0 | 1 | 1 | 0 | 0 | 0 |
| $e_t$ (bt EXOR bt-1) | 0 | 0 | 0 | 0 | 1 | 0 | 0 | 0 | 0 | 0 | 0 | 0 | 1 |
| $f_t$ (ct AND et) | 0 | 0 | 0 | 0 | 1 | 0 | 0 | 0 | 0 | 0 | 0 | 0 | 1 |
| $g_t$ (ct AND dt) | 1 | 0 | 0 | 0 | 0 | 0 | 0 | 0 | 1 | 0 | 0 | 0 | 0 |
| $z_t$ (Yt-CS) | $z_0$ | $z_1$ | $z_2$ | $z_3$ | $z_4$ | $z_5$ | $z_6$ | $z_7$ | $z_8$ | $z_9$ | $z_{10}$ | $z_{11}$ | $z_{12}$ |
| $-z_t$ (CS-Yt) | $-z_0$ | $-z_1$ | $-z_2$ | $-z_3$ | $-z_4$ | $-z_5$ | $-z_6$ | $-z_7$ | $-z_8$ | $-z_9$ | $-z_{10}$ | $-z_{11}$ | $-z_{12}$ |
| $h_t$ (zt AND ft) | 0 | 0 | 0 | 0 | $z_4$ | 0 | 0 | 0 | 0 | 0 | 0 | 0 | $z_{12}$ |
| $i_t$ (-zt AND gt) | $-z_0$ | 0 | 0 | 0 | 0 | 0 | 0 | 0 | $-z_8$ | 0 | 0 | 0 | 0 |
| $j_t$ (ht OR it) | $-z_0$ | 0 | 0 | 0 | $z_4$ | 0 | 0 | 0 | $-z_8$ | 0 | 0 | 0 | $z_{12}$ |
| t (SAMPLING INSTANT) | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |

CLOCK MATCHING APPARATUS FOR A DATA REPRODUCTION SYSTEM

BACKGROUND OF THE INVENTION (1) Field of the Invention

The present invention generally relates to a clock matching apparatus which is appropriate for a data reproduction system of a data storage device, such as an optical disk drive, a magnetic disk drive or a magneto-optical disk drive. More particularly, the present invention relates to a clock matching apparatus which supplies a clock signal to a sampler of a data reproduction system in which a readout signal obtained from a storage medium is sampled periodically at sampling instants synchronized with the clock signal, so that the written data is reconstructed from the samples through the Viterbi algorithm.

(2) Description of the Related Art

In a data reproduction system, a readout signal obtained from a storage medium must be sampled periodically at the sampling instants synchronized with a clock signal. To perform this periodic sampling at the sampler of the data reproduction system, it is required to extract a clock signal from the readout data signal. Hereinafter, the process of extracting such a clock signal from the readout data signal will be called the clock generation.

It should be noted that, in order to reconstruct the written information, the data reproduction system must know not only the sampling frequency (1/T) at which the output of the head is sampled, but also where to take the samples within each sampling interval. Hereinafter, the choice of a sampling instant within the sampling interval of duration T will be called the clock matching or the detection of the timing phase.

Recently, data storage devices, such as magneto-optical disk drives, require an increasingly high recording density of the storage medium. As the recording density of the storage medium increases, the sampling frequency at which the readout signal is sampled becomes higher. To achieve a high recording density and a high sampling frequency than before, it is necessary that the clock matching apparatus very quickly compensates for a phase error of the clock signal to be supplied to the sampler of the data reproduction system.

However, a conventional clock matching apparatus of a data reproduction system estimates a phase error of a clock signal by using a feedback loop of the processed readout data (for example, a midpoint value of the readout signal) via a Viterbi detection module. The compensation for the phase error of the clock signal must be performed based on the result of the computation by the Viterbi algorithm which frequently requires a large amount of the computation time. For example, Japanese Laid-Open Patent Application No. 8-87,828 discloses a conventional clock matching apparatus of the above type. It is difficult for the conventional clock matching apparatus to quickly compensate for the phase error of the clock signal to be supplied to the sampler of the data reproduction system, because of the time-consuming feedback loop via the Viterbi detection module. This makes it difficult to achieve an increased sampling frequency of the data reproduction system in conformity with a higher recording density of the storage medium.

SUMMARY OF THE INVENTION

An object of the present invention is to provide an improved clock matching apparatus in which the above-mentioned problems are eliminated.

Another object of the present invention is to provide a clock matching apparatus which can quickly compensate for a phase error of the clock signal to be supplied to the sampler of the data reproduction system, so as to achieve a high sampling frequency of the data reproduction system in conformity with a high recording density of the storage medium.

The above-mentioned objects of the present invention are achieved by a clock matching apparatus which supplies a clock signal to a sampler of a data reproduction system so that a readout signal obtained from a storage medium is sampled periodically at sampling instants synchronized with the clock signal, in order to recover written information in the data reproduction system, the clock matching apparatus including: a phase error detection unit which detects a phase error of the clock signal based on the samples of the readout signal output by the sampler; and a phase-locked loop which supplies a phase-matched clock signal to the sampler by compensating for the phase error detected by the phase error detection unit, the phase error detection unit including: an edge detection unit which detects a sampling instant for an edge sample among the samples of the readout signal; and a difference unit which generates a difference in timing phase between the edge sample and a sync level, the sync level being a reference signal level corresponding to a level of the readout signal at the sampling instants thereof and defined based on a partial-response waveform, the difference in the timing phase being output to the phase-locked loop as the detected phase error.

In the clock matching apparatus of the present invention, a phase error of the clock signal is calculated directly from the waveform of the readout data signal with no need for a feedback loop of the processed readout data via the Viterbi detection module. It is possible for the clock matching apparatus of the present invention to quickly compensate for the phase error of the clock signal to be supplied to the sampler of the data reproduction system. The clock matching apparatus of the present invention is effective in achieving a high sampling frequency of the data reproduction system in conformity with a high recording density of the storage medium.

BRIEF DESCRIPTION OF THE DRAWINGS

Other objects, features and advantages of the present invention will become more apparent from the following detailed description when read in conjunction with the accompanying drawings in which:

FIG. 7 is a diagram for explaining operations of the edge detection circuit when the samples of the readout signal shown in FIG. 6 are processed;

DETAILED DESCRIPTION OF THE PREFERRED EMBODIMENTS

A description will now be given of the preferred embodiments of the present invention with reference to the accompanying drawings.

Figure 1:
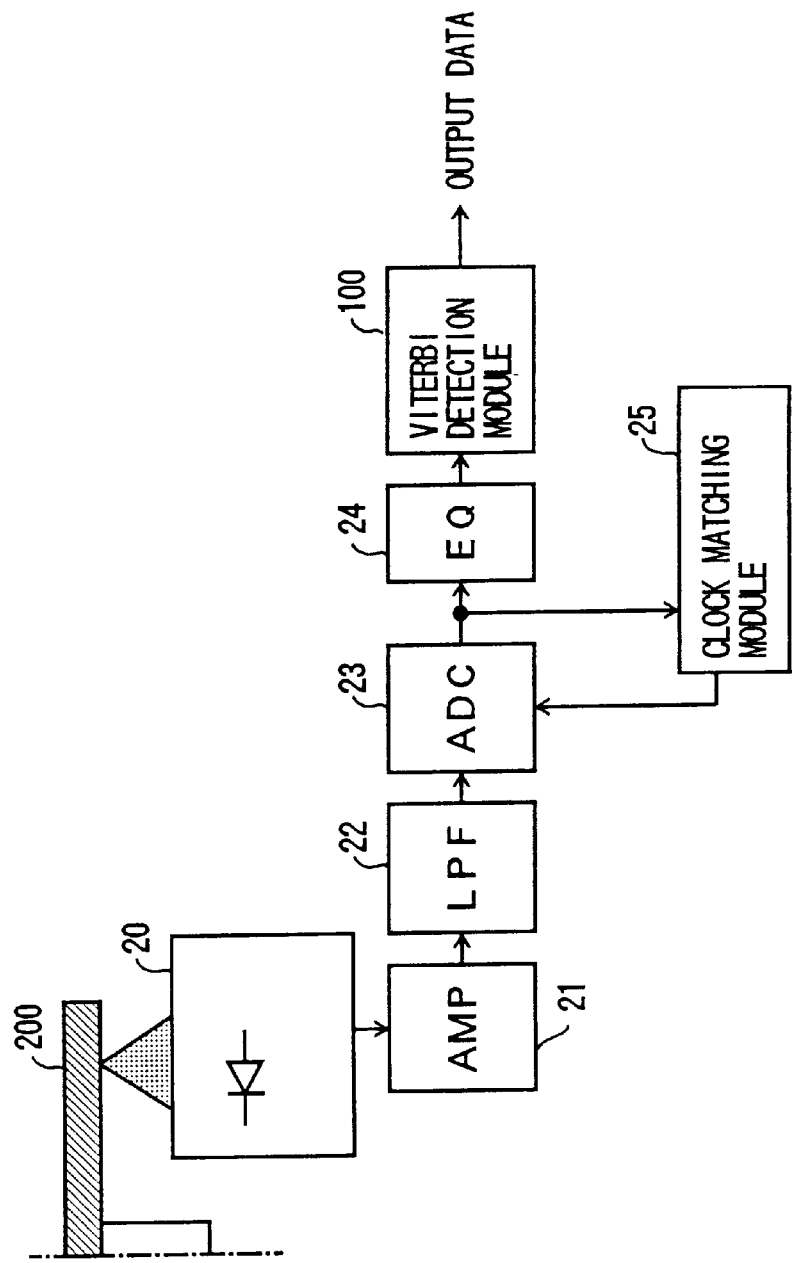
FIG. 1 is a block diagram of a data reproduction system to which one embodiment of a clock matching apparatus of the present invention is applied.

FIG. 1 shows a data reproduction system to which one embodiment of the clock matching apparatus of the present invention is applied. The present embodiment of the clock matching apparatus is applied to, for example, a data reproduction system of a magneto-optical disk drive. Suppose that such an example is shown in FIG. 1.

In the data reproduction system of FIG. 1, a magneto-optical disk 200 is used as a storage medium of the magneto-optical disk drive. In the storage medium of the above type, a pattern of pits which carries the information about the state of magnetization is formed so as to record the information onto the disk 200. In the data reproduction system, a readout signal, which is indicative of rising edges and trailing edges of the pits on the disk 200, is generated by using an optical head 20. The written information of the disk 200 is recovered from the readout signal by the data reproduction system.

As shown in FIG. 1, the readout signal generated by the head 20 is amplified at an amplifier (AMP) 21. The amplified readout signal output by the AMP 21 is subjected to the waveform shaping at a lowpass filter (LPF) 22. The analog readout signal output by the LPF 22 is sampled periodically by an analog-to-digital converter (ADC) 23. The ADC 23 will also be referred to as the sampler 23. The ADC 23 converts the readout signal into a digital-form readout signal in synchronism with a clock signal supplied by a clock matching module 25, so that the samples are supplied to an equalizer (EQ) 24. The EQ 24 subjects the samples to the waveform equalization, and the resulting samples are supplied from the EQ 24 to a Viterbi detection module 100. The Viterbi detection module 100 acts to detect the written information from the samples through the Viterbi algorithm, so that the reconstructed data is output from the Viterbi detection module 100. In the data reproduction system of FIG. 1, the EQ 24 and the Viterbi detection module 100 also operate in synchronism with the clock signal supplied by the clock matching module 25, which are not indicated in FIG. 1 and FIG. 2.

Figure 2:
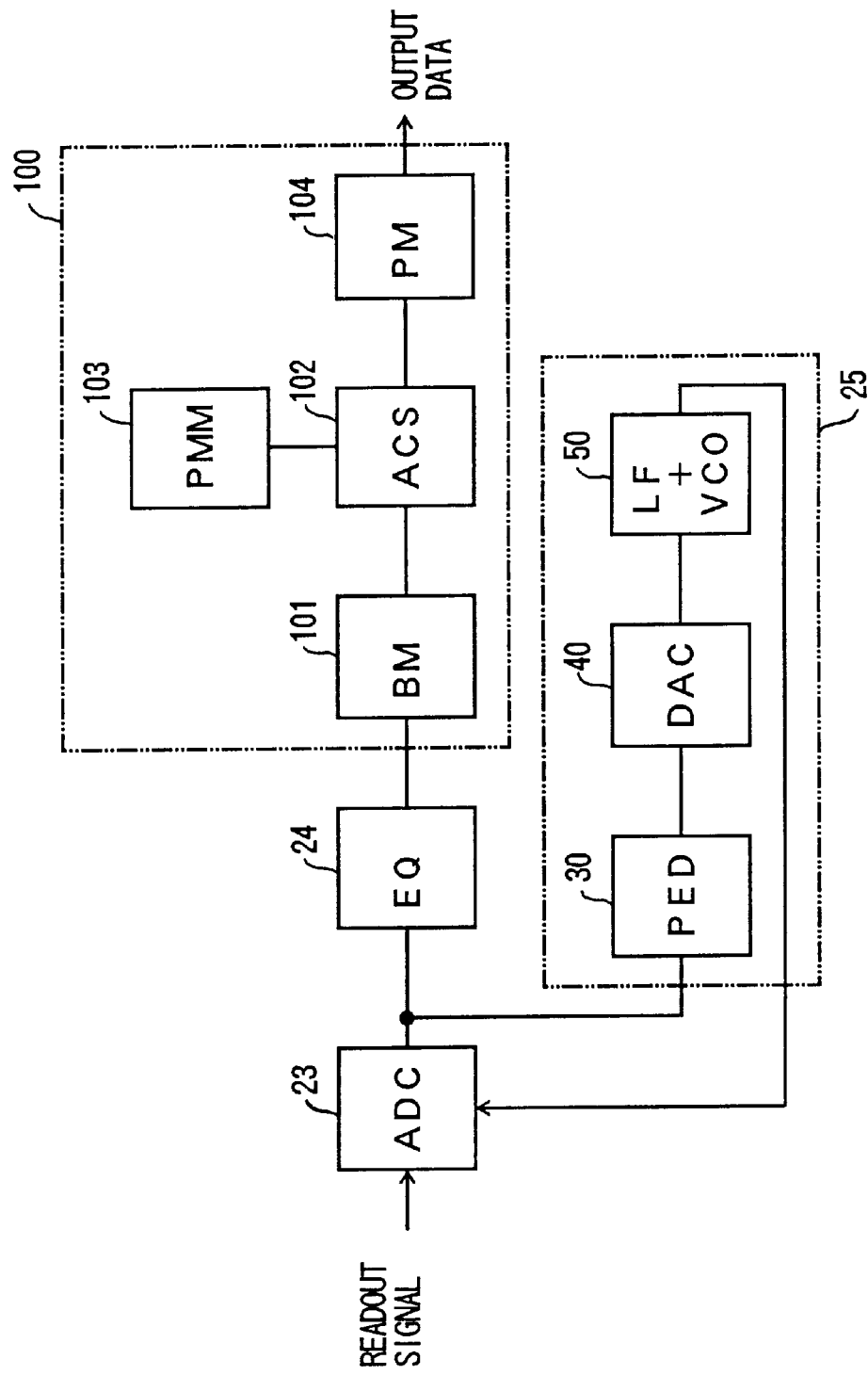
FIG. 2 is a block diagram of a Viterbi detection module and a clock matching module in the data reproduction system.

FIG. 2 shows the Viterbi detection module and the clock matching module in the data reproduction system of FIG. 1. In FIG. 2, the elements which are the same as corresponding elements in FIG. 1 are designated by the same reference numerals, and a description thereof will be omitted.

As shown in FIG. 2, the Viterbi detection module 100 generally has a branch metric unit (BM) 101, an add-compare-select unit (ACS) 102, a path metric memory (PMM) 103, and a path memory (PM) 104. This configuration is similar to that of a known Viterbi detector.

The BM 101 acts to compute a branch metric which corresponds to the difference between the expected partial-response waveform and the readout signal samples. Suppose that a previous path metric for the previous sampling instant that occurs prior to a current sampling instant by the sampling interval is stored in the PMM 103. The ACS 102 acts to add the branch metric to a current path metric for the current sampling instant, and add the branch metric to the previous path metric from the PMM 103. The ACS 102 acts to compare these metrics, and to select the most probable path through the trellis upon observing the received data sequence at the sampling instants.

Each node in the trellis will have the incoming paths and the corresponding metrics. One out of the incoming paths is selected as the most probable, based on the values of the metrics, and the other paths and their metrics are discarded from the trellis. The surviving paths at each node is then extended to new paths, one for each of the possible input symbols, and the search process continues. This is basically the Viterbi algorithm for performing the trellis search. In this manner, a group of the surviving paths and the corresponding metrics is created from the output of the EQ 24, and stored in the PM 104, so that the output data sequence is output from the PM 104.

As shown in FIG. 2, the clock matching module 25 generally has a phase error detection unit (PED) 30, a digital-to-analog converter (DAC) 40, and a phase-locked loop 50. The PED 30 detects a phase error of the clock signal based on the samples supplied to the PED 30 by the ADC 23. The phase error of the clock signal, detected by the PED 30, is converted at the DAC 40 into a corresponding voltage level (the analog signal) for the phase error of the clock signal. The present embodiment of the clock matching apparatus is applied to the clock matching module 25 of the data reproduction system shown in FIG. 2.

In the clock matching module 25 of FIG. 2, the PLL 50 generally has a loop filter (LP) and a voltage-controlled oscillator (VCO). The input to the PLL 50 is the corresponding voltage level (the analog signal) for the phase error of the clock signal. The output of the PLL 50 is the locally oscillated clock signal of the VCO whose phase is locked to the timing phase of the clock signal by using the corresponding voltage level to correct the oscillator frequency until the phase equality is reached. Hence, the PLL 50 compensates for the phase error of the clock signal, and supplies a phase-matched clock signal to the ADC 23 (or the sampler of the data reproduction system of FIG. 1).

Figure 3:
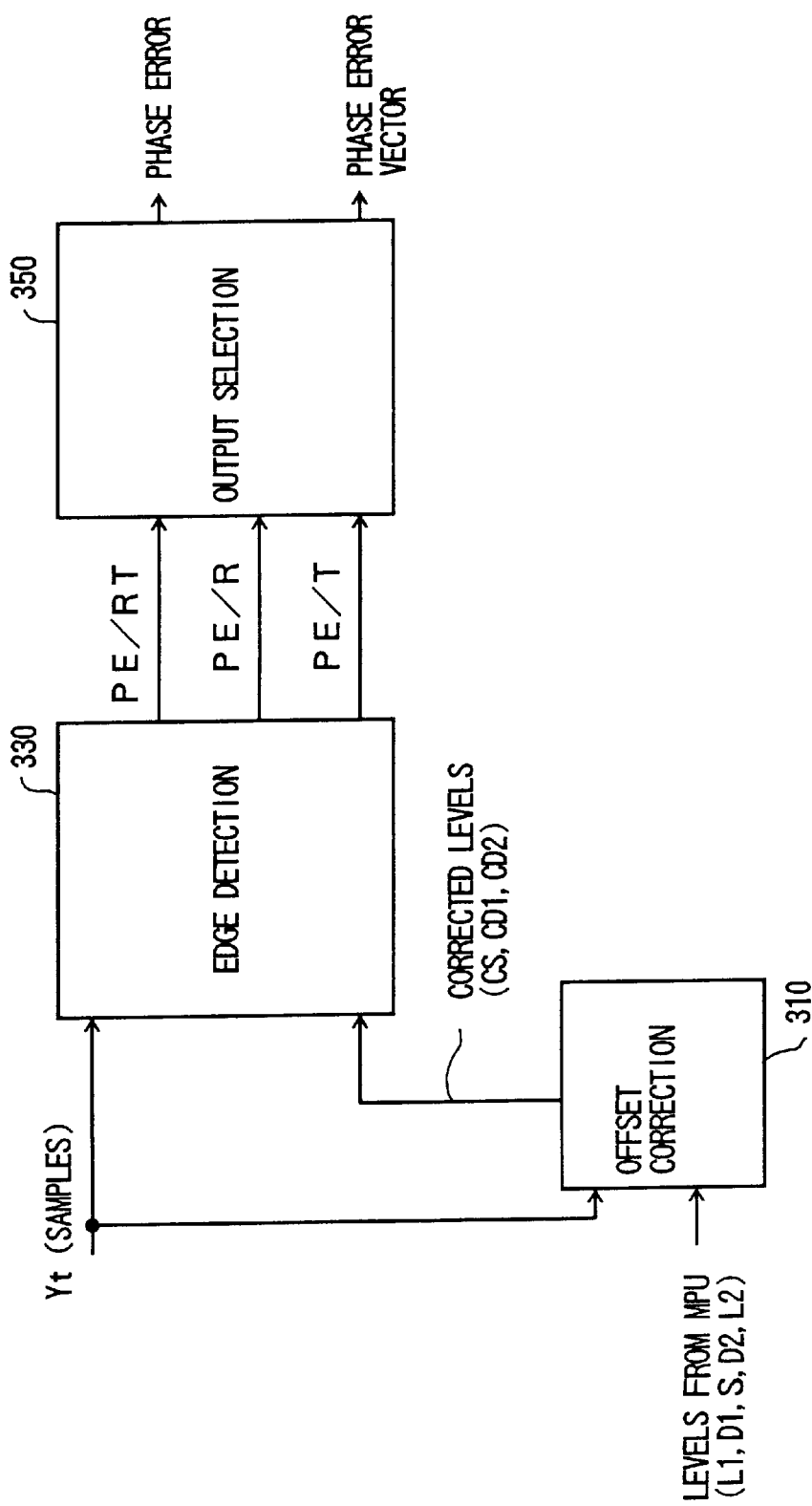
FIG. 3 is a block diagram of a phase error detection unit in the clock matching module of FIG. 2.

FIG. 3 shows a phase error detection unit (PED) 30 in the clock matching module 25 of FIG. 2.

As shown in FIG. 3, the PED 30 generally has an offset correction circuit 310, an edge detection circuit 330, and an output selection circuit 350. The samples Yt, supplied from the ADC 23, are input to the offset correction circuit 310. Suppose that, in order to enable the detection of a phase error by the PED 30, initial reference levels, including a sync level S, decision levels D1 and D2, and limit levels L1 and L2, are supplied from a microprocessor unit MPU (not shown) of the data reproduction system to the offset correction circuit 310. The initial reference levels are provided without taking account of an envelope variation of the readout signal.

The sync level S, supplied from the MPU to the offset correction circuit 310, is a reference signal level corresponding to a level of the readout signal at the precise sampling instants thereof, which is defined based on the partial-response waveform. The decision levels D1 and D2 (D2<S<D1) are provided to detect an intermediate range of the level of the readout signal including the reference signal level S, in order to facilitate the detection of the phase error. The limit levels L1 and L2 (L2<D2, D1<L1) are provided to detect upper and lower limits of an effective range of the level of the readout signal in order to facilitate the detection of a phase error.

The offset correction circuit 310 estimates an offset of the readout signal level caused by the envelope variation thereof, based on the samples Yt output by the ADC 23. In such a manner that the offset of the readout signal level is eliminated, the offset correction circuit 310 generates corrected reference levels CS, CD1, CD2, CL1 and CL2, which correspond to the initial reference levels S, D1, D2, L1 and L2, respectively. The corrected reference levels for detection of the phase error in which the envelope variation of the readout signal is considered, are supplied from the offset correction circuit 310 to the edge detection circuit 330.

The samples Yt, supplied from the ADC 23, are input to the edge detection circuit 330. Also, the corrected sync level CS, the corrected decision levels CD1 and CD2 and the corrected limit levels CL1 and CL2, supplied from the offset correction circuit 310, are input to the edge detection circuit 330. The edge detection circuit 330 performs the comparison of the level of each of the samples Yt and the corrected reference levels CS, CD1 and CD2, and generates a rising-edge phase error of the clock signal (corresponding to the timing of the rising edges of the pits of the disk 200), a trailing-edge phase error of the clock signal (corresponding to the timing of the trailing edges of the pits), and a total phase error of the clock signal (corresponding to the timing of the rising and trailing edges of the pits), based on the results of the above-mentioned comparison.

Specifically, in the phase error detection unit (PED) 30 of the present embodiment, the edge detection circuit 330 generates a first difference in the timing phase between the rising-edge sample and the corrected sync level CS. Every time a rising edge in the samples Yt is detected, the edge detection circuit 330 outputs the first difference to the output selection circuit 350 as the rising-edge phase error (which is indicated by "PE/R" in FIG. 3). The edge detection circuit 330 generates a second difference in the timing phase between the trailing-edge sample and the corrected sync level CS. Every time a trailing edge in the samples Yt is detected, the edge detection circuit 330 outputs the second difference to the output selection circuit 350 as the trailing-edge phase error (which is indicated by "PE/T" in FIG. 3). Further, every time a rising edge or a trailing edge in the samples Yt is detected, the edge detection circuit 330 outputs one of the first difference or the second difference to the output selection circuit 350 as the total phase error (which is indicated by "PE/RT" in FIG. 3).

In the clock matching apparatus of the present invention, the MPU of the data reproduction system supplies an output-select signal (OS) to the output selection circuit 350. The output selection circuit 350 selects one of the phase errors PE/R, PE/T and PE/RT, output by the edge detection circuit 330, in accordance with the value of the signal OS. The selected phase error output by the output selection circuit 350 is supplied to the DAC 40, and the corresponding voltage level (the analog signal) for the phase error of the clock signal at the output of the DAC 40 is supplied to the PLL 50. As previously described with reference to FIG. 2, the PLL 50 compensates for the phase error of the clock signal, and supplies a phase-matched clock signal to the ADC 23 (or the sampler of the data reproduction system of FIG. 1).

Figure 4:
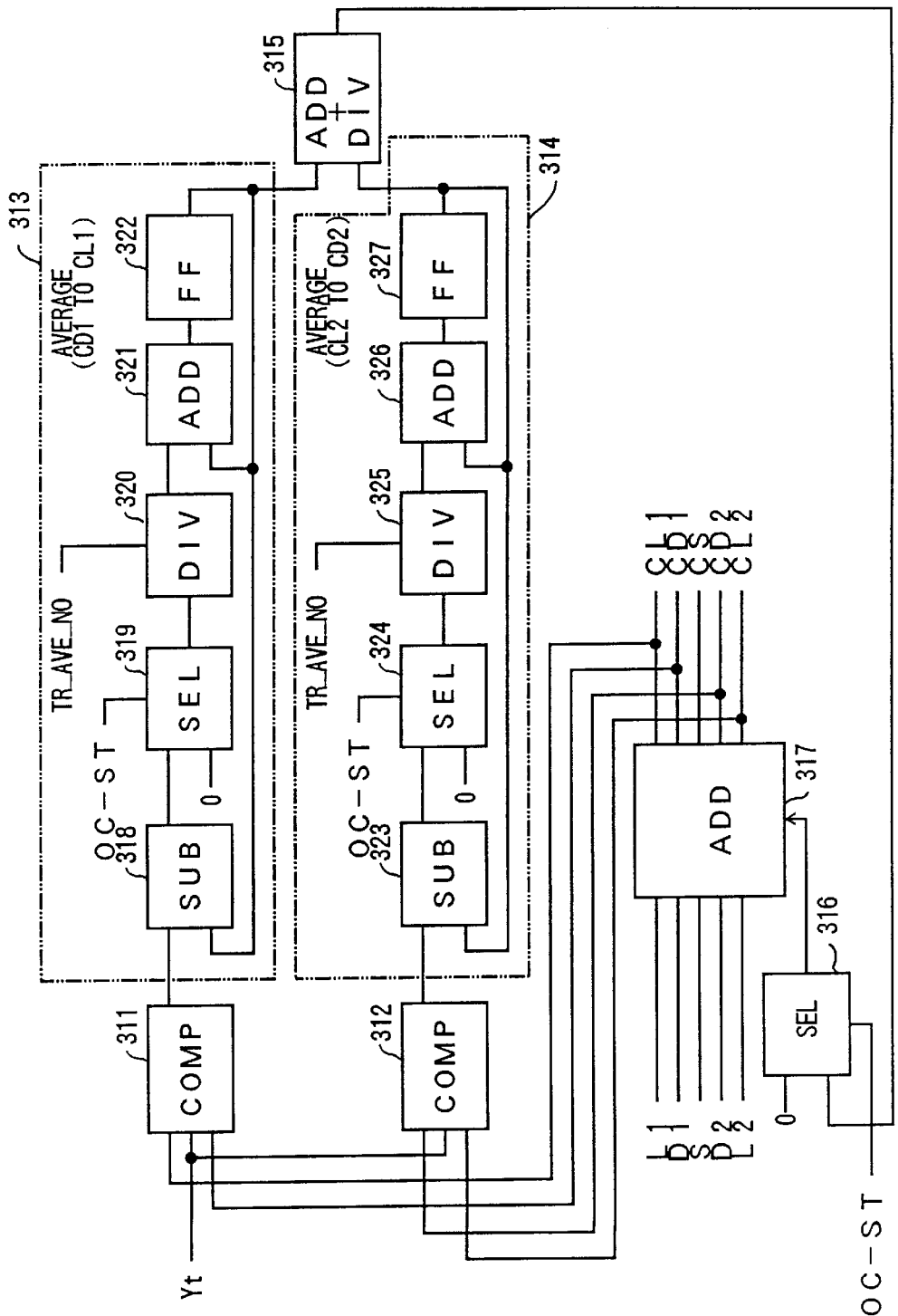
FIG. 4 is a block diagram of an offset correction circuit in the phase error detection unit of FIG. 3.

The configuration shown in FIG. 4 is an example of the offset correction circuit 310 in the phase error detection unit of FIG. 3.

As shown in FIG. 4, the offset correction circuit 310 generally has a comparator 311, an average computation block 313, a comparator 312, an average computation block 314, an average unit 315, a selector (SEL) 316, and an adder (ADD) 317.

In the offset correction circuit 310 of FIG. 4, the average computation block 313 includes a subtracter (SUB) 318, a selector (SEL) 319, a divider (DIV) 320, an adder (ADD) 321, and a register (FF) 322. Similarly, the average computation block 314 includes a subtracter (SUB) 323, a selector (SEL) 324, a divider (DIV) 325, an adder (ADD) 326, and a register (FF) 327.

The comparator 311 compares the samples Yt output from the sampler (ADC) 23, with both the decision level CD1 and the limit level CL1. The comparator 311 allows only the samples Yt whose signal level is above the decision level CD1 and below the limit level CL1 to be supplied to the average computation block 313. The samples Yt whose signal level is outside the range between the CD1 and the CL1 are discarded. The comparator 312 compares the samples Yt output from the sampler (ADC) 23, with both the decision level CD2 and the limit level CL2. The comparator 312 allows only the samples Yt whose signal level is below the decision level CD2 and above the limit level CL2 to be supplied to the average computation block 314. The samples Yt whose signal level is outside the range between the CL2 and the CD2 are discarded.

The average computation block 313 acts to produce an average of the levels of the samples Yt which are above the decision level CD1 and below the limit level CL1 (CD1≦Yt≦CL1). The subtracter 318 outputs a difference between the level of the current sample and the previous average of the levels of the samples Yt output from the FF 322. The difference, output by the SUB 318, is supplied to the divider 320 via the selector 319. The divider 320 divides the difference by the number (TR_AVE_NO) of the samples Yt including the current sample, and outputs the resulting value (called the quotient) to the adder 321. The adder 321 adds the quotient to the previous average of the levels of the samples Yt output from the FF 322, and outputs the sum (called the new average value) of the quotient and the previous average) to the FF 322. The new average value output by the ADD 321 is stored by the FF 322. In this manner, the average computation block 313 produces an average of the levels of the upper-peak samples Yt (CD1≦Yt≦CL1).

Similar to the average computation block 313, the average computation block 314 produces an average of the levels of the lower-peak samples Yt (CL2≦Yt≦CD2). The average unit 315 produces a sum of the average of the levels of the upper-peak samples Yt from the average computation block 313 and the average of the levels of the lower-peak samples Yt from the average computation block 314, and divides the sum of the two averages by 2. The resulting value at the output of the average unit 315 approximately indicates a midpoint value of the upper-peak and lower-peak samples Yt. Hence, the value at the output of the average unit 315 indicates an estimated offset of the readout signal level caused by the envelope variation thereof.

In the offset correction circuit 310 of FIG. 4, the value (the estimated offset) output from the average unit 315 is supplied to the adder 317 via the selector 316. As previously described, the initial reference levels (including the sync level S, the decision levels D1 and D2 and the limit levels L1 and L2) are supplied from the MPU of the data reproduction system to the adder 317 of the offset correction circuit 310. The adder 317 adds the estimated offset to each of the initial reference levels (S, D1, D2, L1, L2). Hence, the adder 317 outputs the corrected reference levels (CS, CD1, CD2, CL1, CL2) in which the offset of the readout signal level is eliminated. As shown in FIG. 2, the corrected reference levels CD1 and CL1 at the output of the adder 317 are supplied to the comparator 311, and the corrected reference levels CD2 and CL2 at the output of the adder 317 are supplied to the comparator 312.

In the above-described offset correction circuit 310, an estimated offset of the readout signal level is supplied from the average unit 315 to the adder 317, and the adder 317 outputs the corrected reference levels (CS, CD1, CD2, CL1, CL2) in which the offset of the readout signal level is eliminated. It is possible for the above-described offset correction circuit 310 to correct the reference levels being supplied to the edge detection circuit 330 such that the offset of the readout signal level caused by the envelope variation of the readout signal is eliminated.

The offset correction circuit 310 of FIG. 4 may be activated by an offset correction start signal (OC-ST) which is supplied from the MPU of the data reproduction system to each of the selectors 316, 319, and 324. When the signal OC-ST is set in ON state, the above offset correction procedure is carried out by the offset correction circuit 310 of FIG. 4. On the other hand, when the signal OC-ST is set in OFF state, each of the selectors 316, 319 and 324 outputs the value "0", and the value (the estimated offset) supplied from the selector 316 to the adder 317 is always equal to the value "0". In this case, the adder 317 outputs the initial reference levels (S, D1, D2, L1, L2), supplied by the MPU, to the edge detection circuit 330 without performing the offset correction.

Figure 5:
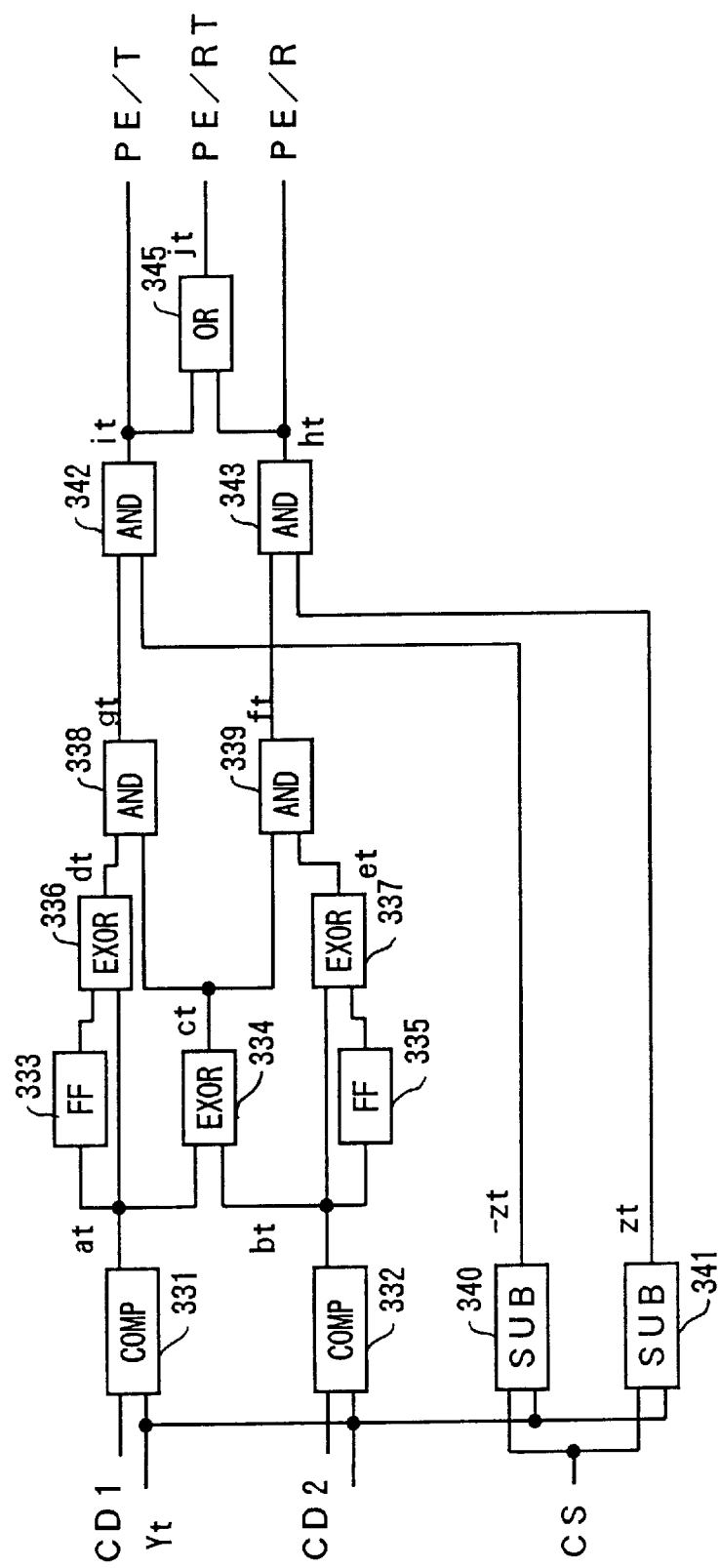
FIG. 5 is a block diagram of an edge detection circuit in the phase error detection unit of FIG. 3.

The configuration shown in FIG. 5 is an example of the edge detection circuit 330 in the phase error detection unit of FIG. 3.

In the edge detection circuit 330 of FIG. 5, the corrected reference levels CS, CD1 and CD2, supplied by the offset correction circuit 310, are used to output the rising-edge phase error "PE/R", the trailing-edge phase error "PE/T" and the total phase error "PE/RT". These phase errors are supplied from the edge detection circuit 330 to the output selection circuit 350.

As shown in FIG. 5, the edge detection circuit 330 includes a comparator (COMP) 331, a comparator (COMP) 332, a register (FF) 333, an EXOR gate 334, a register (FF) 335, an EXOR gate 336, an EXOR gate 337, an AND gate 338, an AND gate 339, a subtracter (SUB) 340, a subtracter (SUB) 341, an AND gate 342, an AND gate 343, and an OR gate 345.

In the edge detection circuit 330 of FIG. 5, the comparator 331 compares each sample Yt with the corrected decision level CD1 supplied by the offset correction circuit 310 (CS<CD1). When Yt≧CD1, the output signal "at" of the comparator 331 is set to the value "1" (at=1). When Yt<CD1, the output signal "at" of the comparator 331 is set to the value "0" (at=0). The comparator 332 compares each sample Yt with the corrected decision level CD2 supplied by the offset correction circuit 310 (CS>CD2). When Yt≧CD2, the output signal "bt" of the comparator 332 is set to the value "1" (bt=1). When Yt<CD2, the output signal "bt" of the comparator 332 is set to the value "0" (bt=0).

The output signal "at" of the comparator 331 is stored in the register 333, and at the same time, it is transferred to the EXOR gate 336. A previous value "a(t−1)" of the output signal "at" which was stored in the register 333 at a previous sampling instant prior to the current sampling instant by the sampling interval is also transferred to the EXOR gate 336. The EXOR gate 336 produces the output signal dt=1 if only one of the two inputs "at" and "a(t−1)" is equal to the value "1". Otherwise the EXOR gate 336 produces the output signal dt=0. The output signal "dt" of the EXOR gate 336 indicates whether the level of the readout signal for the current sample crosses the corrected decision level CD1.

The output signal "bt" of the comparator 332 is stored in the register 335, and at the same time, it is transferred to the EXOR gate 337. A previous value b(t−1) of the output signal "bt" which was stored in the register 335 at the previous sampling instant prior to the current sampling instant by the sampling interval is also transferred to the EXOR gate 337. The EXOR gate 337 produces the output signal et=1 if only one of the two inputs "bt" and "b(t−1" is equal to the value "1". Otherwise the EXOR gate 337 produces the output signal et=0. The output signal "et" of the EXOR gate 337 indicates whether the level of the readout signal for the current sample crosses the corrected decision level CD2.

Further, both the output signal "at" of the comparator 331 and the output signal "bt" of the comparator 332 are transferred to the EXOR gate 334. The EXOR gate 334 produces the output signal ct=1 if only one of the two inputs "at" and "bt" is equal to the value "1". Otherwise the EXOR gate 334 produces the output signal ct=0. The output signal "ct" of the EXOR gate 334 indicates whether the level of the readout signal for the current sample Yt is within the range of the signal level between the corrected decision level CD2 and the corrected decision level CD1 with the corrected sync level CS centered (CD2≦Yt≦CD1).

Both the output signal "dt" of the EXOR gate 336 and the output signal "ct" of the EXOR gate 334 are transferred to the AND gate 338. The AND gate 338 produces the output signal gt=1 only when both the two inputs "dt" and "ct" are equal to the value "1". Otherwise the AND gate 338 produces the output signal gt=0. If the output signal "gt" of the AND gate 338 is set to the value "1", it indicates that the level of the readout signal is decreasing and the current sample just falls within the range of the signal level between the corrected decision level CD2 and the corrected decision level CD1 with the corrected sync level CS centered. Therefore, depending on the value of the output signal "gt" of the AND gate 338, the edge detection circuit 330 detects a sampling instant for a trailing-edge sample among the samples of the readout signal.

Both the output signal "et" of the EXOR gate 337 and the output signal "ct" of the EXOR gate 334 are transferred to the AND gate 339. The AND gate 339 produces the output signal ft=1 only when both the two inputs "et" and "ct" are equal to the value "1". Otherwise the AND gate 339 produces the output signal ft=0. If the output signal "ft" of the AND gate 339 is set to the value "1", it indicates that the level of the readout signal is increasing and the current sample just falls within the range of the signal level between the corrected decision level CD2 and the corrected decision level CD1 with the corrected sync level CS centered. Therefore, depending on the value of the output signal "ft" of the AND gate 339, the edge detection circuit 330 detects a sampling instant for a rising-edge sample among the samples of the readout signal.

In the edge detection circuit 330 of FIG. 5, the subtracter 340 and the subtracter 341 constitute a difference unit, in the clock matching apparatus of the present invention, which generates a difference in timing phase between an edge sample and the corrected sync level CS.

As shown in FIG. 5, the subtracter 341 produces a difference "zt" in the timing phase between each sample Yt and the corrected sync level CS (zt=Yt−CS), and outputs the difference "zt" to the AND gate 343. The subtracter 340 produces a difference "−zt" in the timing phase between the corrected sync level CD and each sample Yt (−zt=CS−Yt), and outputs the difference "−zt" to the AND gate 342. The AND gate 343 is allowed to produce the output signal ht=zt only when the input signal "ft" is equal to the value "1". Otherwise the AND gate 343 produces the output signal ht=0. The AND gate 342 is allowed to produce the output signal it=−zt only when the input signal "gt" is equal to the value "1". Otherwise the AND gate 342 produces the output signal it=0. Both the output signal "it" of the AND gate 342 and the output signal "ht" of the AND gate 343 are transferred to the OR gate 345.

As described above, the sampling instant when the input signal "gt" of the AND gate 342 is equal to the value "1" is a sampling instant for a trailing-edge sample among the samples of the readout signal, and the sampling instant when the input signal "ft" of the AND gate 343 is equal to the value "1" is a sampling instant for a rising-edge sample among the samples of the readout signal. Accordingly, in the edge detection circuit 330 of FIG. 5, the AND gate 342 generates the output signal it=−zt which indicates the trailing-edge phase error PE/T of the clock signal, and the AND gate 343 generates the output signal ht=zt which indicates the rising-edge phase error PE/R of the clock signal.

In the edge detection circuit 330 of FIG. 5, at the sampling instants that correspond to either the trailing-edge sample or the rising-edge sample, the OR gate 345 produces the output signal jt which indicates one of the trailing-edge phase error PE/T or the rising-edge phase error PE/R. Hence, in the edge detection circuit 330 of FIG. 5, the OR gate 345 generates the output signal jt which indicates the total phase error PE/RT of the clock signal.

Figure 6:
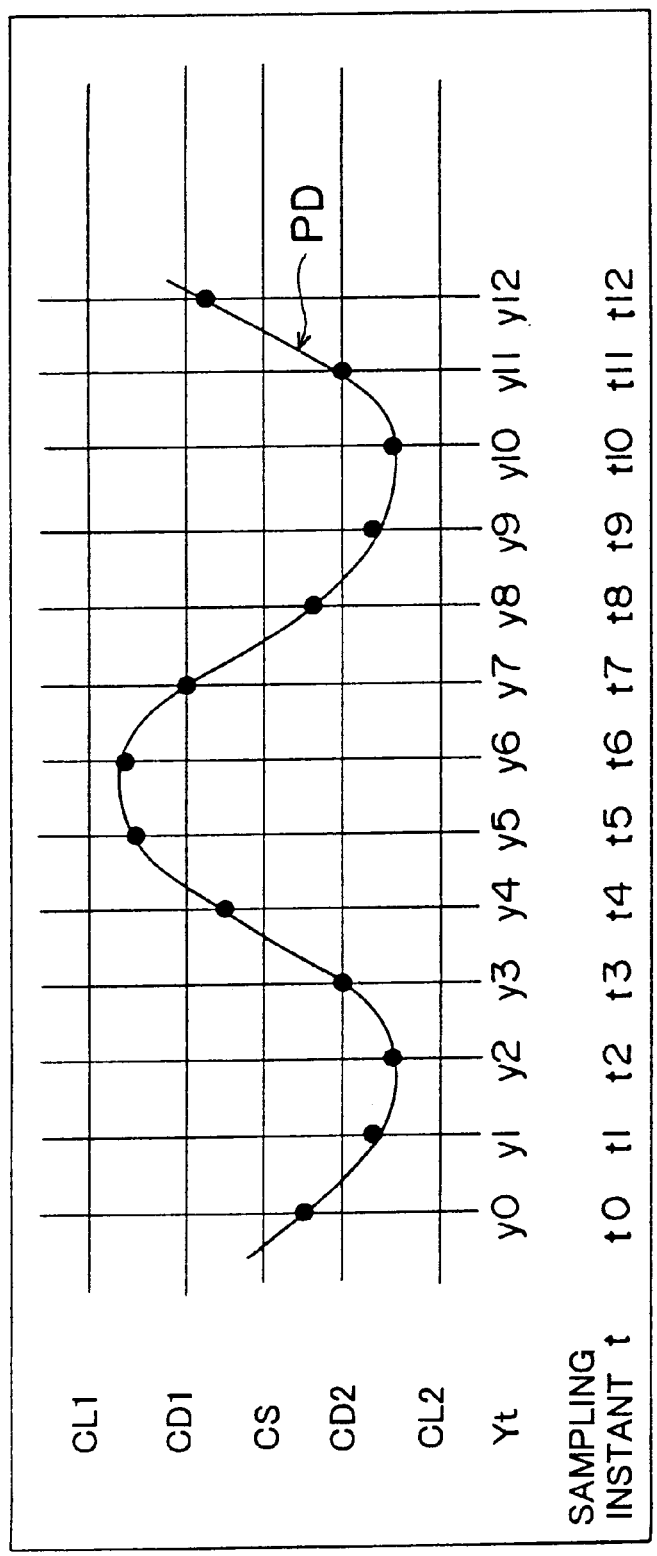
FIG. 6 is a diagram for explaining a relationship between samples of the readout signal and reference levels.

FIG. 6 shows a relationship between the samples of the readout signal and the corrected reference levels. FIG. 7 shows operations of the edge detection circuit 330 when the samples of the readout signal shown in FIG. 6 are processed.

Suppose that the readout signal "PD" and the corrected reference levels "CS" "CD1" "CD2" "CL1" and "CL2" are given, and the readout signal PD is sampled periodically at the sampling instants "t0" through "t12" as shown in FIG. 6. When the samples of the readout signal shown in FIG. 6 are processed by the edge detection circuit 330, the outputs of the respective elements of the edge detection circuit 330 are placed in the condition shown in FIG. 7.

In the above example of FIG. 7, when a rising-edge sample among the samples Yt is detected (or at the sampling instant t4 when ft=1), the edge detection circuit 330 generates the first difference (z4=Y4−CS) in the timing phase between the rising-edge sample and the corrected sync level CS as the rising-edge phase error PE/R (h4). When a trailing-edge sample among the samples Yt is detected (or at the sampling instant t8 when gt=1), the edge detection circuit 330 generates the second difference (−z8=CS−Y8) in the timing phase between the corrected sync level CS and the trailing-edge sample as the trailing-edge phase error PE/T (i8). Further, when the rising-edge sample or the trailing-edge sample among the samples Yt is detected (or at the sampling instant t4 when ft=1 or at the sampling instant t8 when gt=1), the edge detection circuit 330 generates one of the first difference (z4) or the second difference (−z8) as the total phase error PE/RT (j4 or j8).

Figure 8:
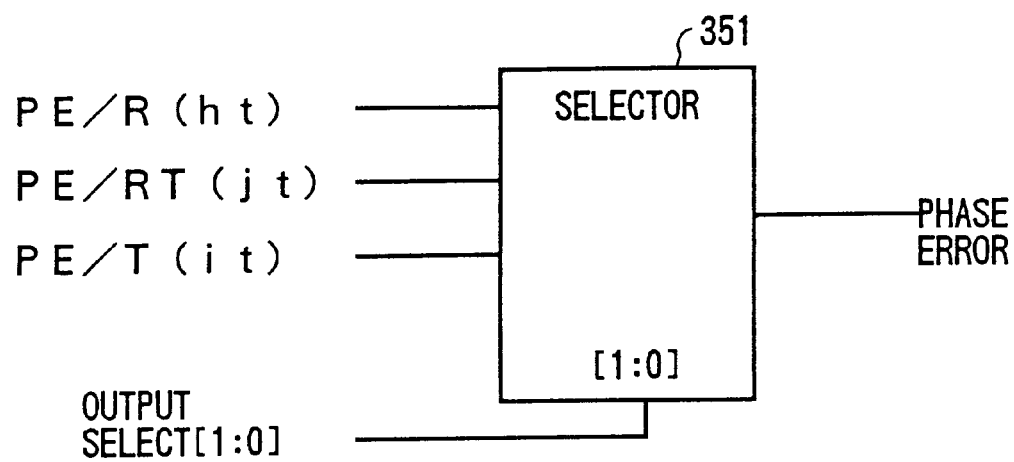
FIG. 8 is a block diagram of an output selection circuit in the phase error detection unit of FIG. 3.

The configuration shown in FIG. 8 is an example of the output selection circuit 350 in the phase error detection unit of FIG. 3.

As shown in FIG. 8, the output selection circuit 350 generally has a selector 351, and this selector 351 includes three inputs to which the rising-edge phase error PE/R (ht), the trailing-edge phase error PE/T (it) and the total phase error PE/RT (jt) are supplied from the edge detection circuit 330. The selector 351 further includes a control input to which the output-select signal (OS) is supplied from the MPU of the data reproduction system to the output selection circuit 350. The selector 351 outputs a selected one of the phase errors PE/R, PE/T and PE/RT to the DAC 40, in accordance with the value of the output-select signal OS. For example, when the output-select signal OS indicates a value [1:0] corresponding to the rising-edge phase error PE/R, the selector 351 outputs the selected phase error PE/R to the DAC 40 in accordance with that value of the output-select signal OS.

In the above-described manner, the phase error detection unit 30 of the clock matching module 25 detects a phase error of the clock signal based on the samples supplied by the ADC 23. The phase error of the clock signal, detected by the PED 30, is converted at the DAC 40 into the corresponding voltage level for the phase error of the clock signal. The PLL 50 outputs the locally oscillated clock signal of the VCO whose phase is locked to the timing phase of the clock signal by using the corresponding voltage level to correct the oscillator frequency until the phase equality is reached. Hence, the clock matching module 25 compensates for the phase error of the clock signal, and supplies a phase-matched clock signal to the ADC 23 (or the sampler of the data reproduction system of FIG. 1). As previously described, in the data reproduction system of FIG. 1, the equalizer 24 and the Viterbi detection module 100 also operate in synchronism with the clock signal supplied by the clock matching module 25, which are not indicated in FIG. 1.

The above-described embodiment of the clock matching apparatus is applied to the clock matching module 25 in the data reproduction system of FIG. 2. The phase error of the clock signal is calculated directly from the waveform of the readout signal by the clock matching apparatus with no need for a time-consuming feedback loop of the processed readout data via the Viterbi detection module 100. It is possible for the clock matching apparatus of the present embodiment to quickly compensate for the phase error of the clock signal to be supplied to the sampler 23 of the data reproduction system. The clock matching apparatus of the present embodiment is effective in achieving a high sampling frequency of the data reproduction system in conformity with a high recording density of the storage medium.

Further, the clock matching apparatus of the present embodiment includes the output selection circuit 350 which can arbitrarily select the desired one of the phase errors PE/R, PE/T and PE/RT being supplied to the DAC 40, by setting the value of the output-select signal OS to indicate the desired one of the phase errors PE/R, PE/T and PE/RT. For example, when the use of the trailing-edge phase error PE/T is not appropriate because of the nonlinearity of a certain readout signal, it is possible to select the rising-edge phase error PE/R being supplied to the DAC 40 in the present embodiment.

Figure 9:
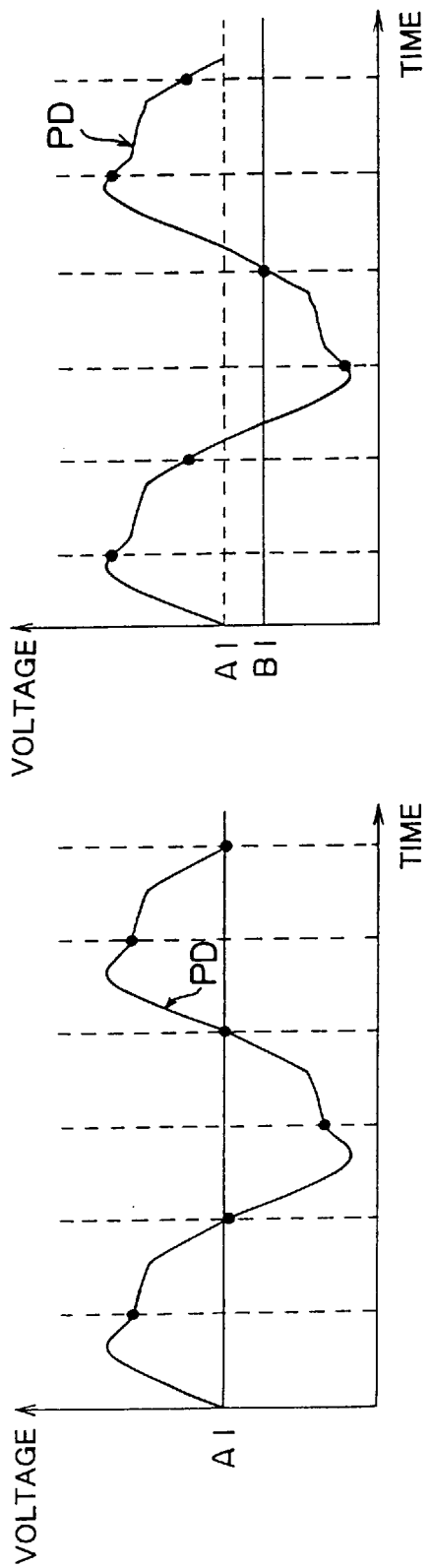
FIG. 9A and FIG. 9B are diagrams for explaining the sampling of the readout signal without clock phase adjustment and the sampling of the readout signal with the clock phase adjustment.

Next, FIG. 9A and FIG. 9B show the sampling of the readout signal without clock phase adjustment and the sampling of the readout signal with the clock phase adjustment.

In the above-described clock matching apparatus as shown in FIG. 2, the PLL 50 supplies a phase-matched clock signal to the sampler 23 by compensating for the phase error output by the phase error detection unit 30. However, in a case of the sampling shown in FIG. 9A, the phase-matched clock signal that is appropriate for the sampling of the readout signal PD at the rising edges or the trailing edges does not adequately suit the sampling of the readout signal PD at the upper peaks or the lower peaks.

Figure 10:
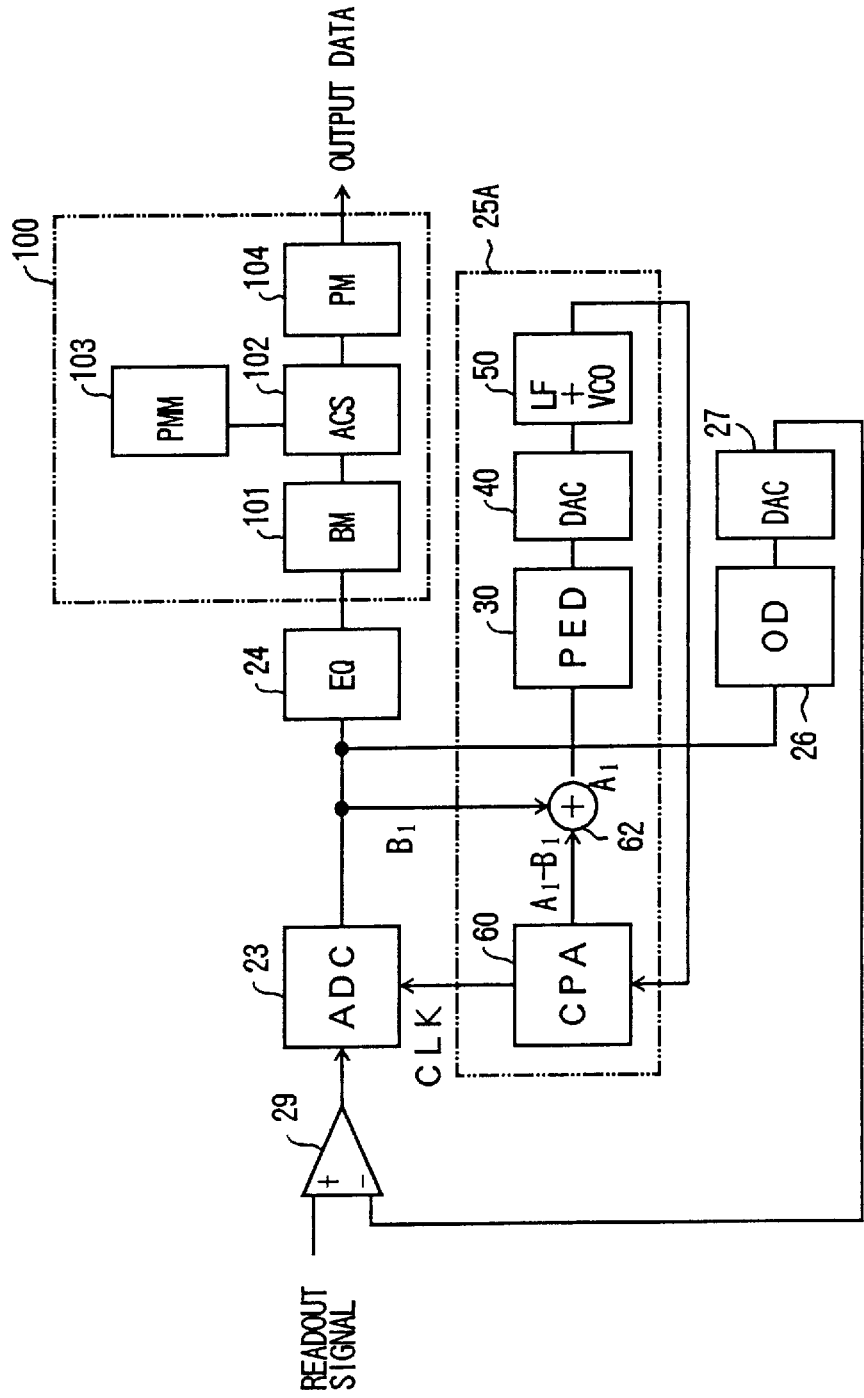
FIG. 10 is a block diagram of another embodiment of the clock matching apparatus of the present invention.

FIG. 10 is a block diagram of another embodiment of the clock matching apparatus of the present invention. The clock matching apparatus of FIG. 10 is provided with a capability of the clock phase adjustment in order to eliminate the above-mentioned problem.

In FIG. 10, the elements which are essentially the same as corresponding elements in FIG. 2 are designated by the same reference numerals, and a description thereof will be omitted. The present embodiment of the clock matching apparatus is applied to a clock matching module 25A in the data reproduction system of FIG. 10.

Similar to the embodiment of FIG. 2, in the data reproduction system of FIG. 10, the ADC 23 converts the readout signal into a digital-form readout signal in synchronism with a clock signal (CLK) supplied by the clock matching module 25A, so that the samples are supplied to the equalizer (EQ) 24. The EQ 24 subjects the samples to the waveform equalization, and the resulting samples are supplied from the EQ 24 to the Viterbi detection module 100. The Viterbi detection module 100 detects the written information from the samples through the Viterbi algorithm, so that the reconstructed data is output from the Viterbi detection module 100. The samples output by the ADC 23 are supplied to the clock matching module 25A.

As shown in FIG. 10, the clock matching module 25A includes a phase error detection unit (PED) 30, a digital-to-analog converter (DAC) 40 and a phase-locked loop (PLL) 50 which are essentially the same as the corresponding elements of the previous embodiment of FIG. 2. The PED 30 in the present embodiment includes the edge detection circuit 330 and the output selection circuit 350 which are the same as in the previous embodiment of FIG. 3. However, the PED 30 in the present embodiment does not include the offset correction circuit 310 as in the previous embodiment of FIG. 3. Instead of the offset correction circuit 310, an offset detection circuit (OD) 26, a digital-to-analog converter (DAC) 27 and a differential amplifier 29 are separately provided in the data reproduction system of FIG. 10, in addition to the clock matching module 25A.

In the data reproduction system of FIG. 10, the OD 26 detects an offset of the readout signal level caused by an envelope variation of the read signal, based on the samples Yt output by the ADC 23. The detected offset output by the OD 26 is converted at the DAC 27 into a corresponding voltage level of the offset. The voltage level output by the DAC 27 is supplied to an inverting input of the amplifier 29. The analog readout signal obtained from the storage medium is supplied to a non-inverting input of the amplifier 29. The amplifier 29 outputs a differential signal (an offset-corrected readout signal) by subtracting the voltage level of the offset at the inverting input from the readout signal at the non-inverting input. As the OD 26, the DAC 27 and the differential amplifier 29 are provided in the data reproduction system of FIG. 10, the offset of the readout signal level caused by the envelope variation can be eliminated from the readout signal which is supplied to the ADC 23.

As shown in FIG. 10, the clock matching module 25A further includes a clock phase adjustment unit (CPA) 60 at the output of the PLL 50, and an adder 62 between the CPA 60 and the PED 30. In the present embodiment of the clock matching apparatus, the CPA 60 is provided to adjust the phase-matched clock signal output by the PLL 50, such that the resulting clock signal adequately suits the sampling of the readout signal at the upper peaks or the lower peaks. The CPA 60 supplies such a clock signal (CLK) to the sampler 23 of the data reproduction system.

Figure 11:
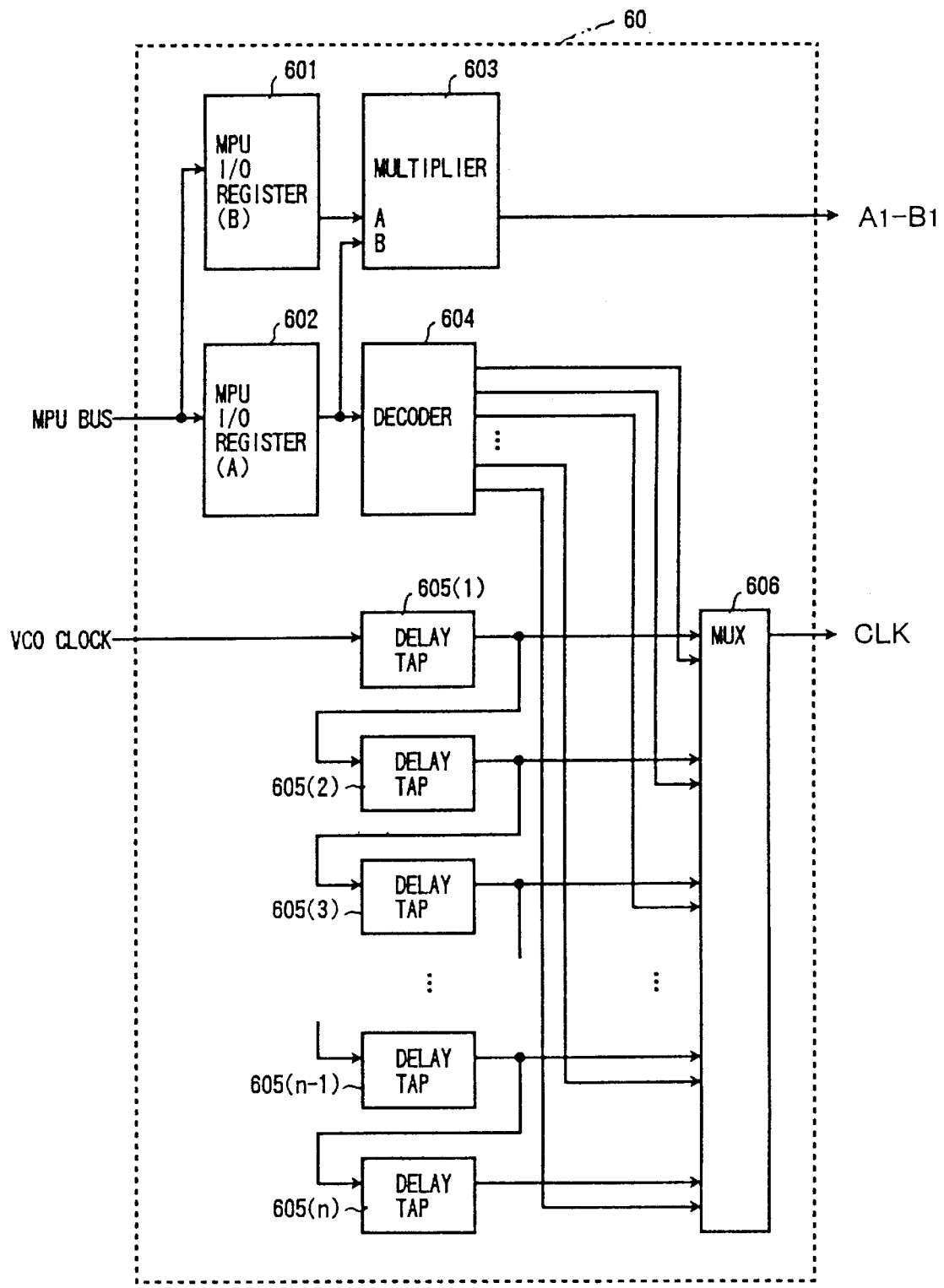
FIG. 11 is a block diagram of a clock phase adjusting unit in the clock matching apparatus of FIG. 10.

The configuration shown in FIG. 11 is an example of the CPA 60 in the clock matching apparatus of FIG. 10.

As shown in FIG. 11, the clock phase adjustment unit (CPA) 60 generally has a register 601, a register 602, a multiplier 603, a decoder 604, a plurality of "n" delay taps 605(1) through 605(n), and a multiplexer (MUX) 606. The delay taps 605(1) through 605(n) are connected in series, and the outputs of these delay taps are connected to the MUX 606 in parallel. The phase-matched clock signal (VCO CLOCK) output by the PLL 50 is supplied to the first delay tap 605(1). The timing phase of the clock signal is delayed by each of the delay taps 605(1) through 605(n). Such phase-delayed clock signals output by these delay taps are supplied to the MUX 606. In the present embodiment, the CPA 60 is configured such that a total delay amount of the delay taps 605(1) through 605(n) is equal to one period of the clock signal (or the sampling interval between the sampling instants at the sampler 23). If the CPA 60 is configured in this manner, the CPA 60 can adjust the phase of the clock signal to be supplied to the sampler 23, into a desired position between a 180°-retarded position and a 180°-advanced position within the sampling interval of duration T, by selecting one of the phase-delayed clock signals (output by the delay taps 605(1) through 605(n)) at the MUX 606.

In the clock phase adjustment unit (CPA) 60 of FIG. 11, a predetermined coefficient K is assigned to the register 601, and a delay factor which corresponds to a desired delay amount of the delay taps 605(1) through 605(n) is assigned to the register 602. The coefficient K and the delay factor are supplied from the MPU (not shown) of the data reproduction system to the registers 601 and 602. The registers 601 and 602 in the CPA 60 may be constituted by I/O registers of the MPU, and these registers are connected to the MPU via a bus. In the CPA 60 of FIG. 11, the registers 601 and 602 are respectively constituted by I/O registers (B) and (A) of the MPU.

The delay factor retained by the register 602 is supplied to the decoder 604, and the decoder 604 produces a select signal based on the delay factor. The select signal output by the decoder 604 is supplied to the MUX 606 so that one of the phase-delayed clock signals is selected at the MUX 606. The selected phase-delayed clock signal is supplied from the MUX 606 to the sampler 23 of the data reproduction system.

In the CPA 60 of FIG. 11, both the coefficient K retained by the register 601 and the delay factor retained by the register 602 are supplied to the multiplier 603. The multiplier 603 produces a product of the coefficient K and the delay factor, and the resulting signal (indicated by "A1−B1" in FIG. 10) is output from the multiplier 603 to one input of the adder 62. The readout signal (indicated by "B1" in FIG. 10) output by the sampler 23 is supplied to the other input of the adder 62. The adder 62 produces a sum (=(Ab1−B1)+B1) of the two input signals, and the resulting signal (indicated by "A1" in FIG. 10) is output from the adder 62 to the PED 30.

FIG. 9B shows the sampling of the readout signal PD with the clock phase adjustment being carried out by the CPA 60.

In a case of the sampling shown in FIG. 9B, the phase-locked clock signal at the output of the PLL 50 is appropriate for the sampling of the readout signal PD at the rising edges or the trailing edges. For example, a rising-edge sample of the readout signal PD accords with the voltage level B1 shown in FIG. 9B. According to the clock phase adjustment performed by the CPA 60, the sync level for the sampling of the readout signal PD can be adjusted to the voltage level A1, and the phase-delayed clock signal CLK at the output of the CPA 60 can adequately suit the sampling of the readout signal PD at the upper peaks or the lower peaks as shown in FIG. 9B.

Figure 12:
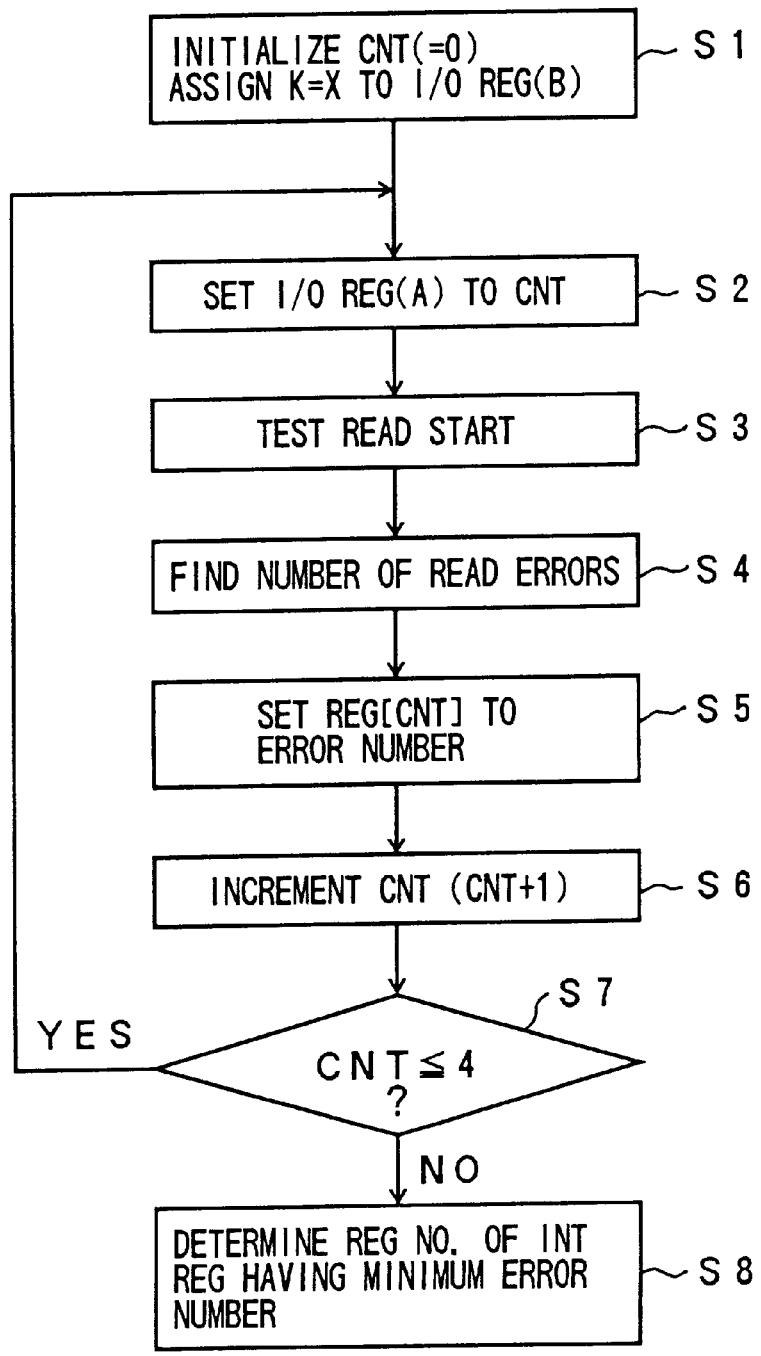
FIG. 12 is a flowchart for explaining a delay factor determination procedure executed by the data reproduction system in order to control the clock phase adjusting unit of FIG. 11.

FIG. 12 shows a delay factor determination procedure executed by the MPU of the data reproduction system in order to control the clock phase adjusting unit 60 of FIG. 11.

By performing the delay factor determination procedure of FIG. 12, the MPU determines a delay factor which corresponds to a desired delay amount of the delay taps 605(1) through 605(n). The resulting delay factor is supplied from the MPU to the register 602 of the CPA 60 such that the CPA 60 can suitably adjust the phase of the clock signal to be supplied to the sampler 23 by selecting one of the phase-delayed clock signals at the MUX 606.

As shown in FIG. 12, at a start of the delay factor determination procedure, the MPU at step S1 initializes a count CNT into the value "o", assigns a predetermined coefficient K (="X") to the register 601 (the I/O register (B) in FIG. 11), and sets five internal registers INT REG(0) through INT REG(4) in their initial conditions. It is assumed that the CPA 60 contains the five delay taps 605(1) through 605(5), and the internal registers INT REG(0) through INT REG(4) correspond to these delay taps respectively. The value X indicates a unit delay amount of the delay taps 605(1) through 605(5).

The MPU at step S2 sets the register 602 (the I/O register (A) in FIG. 11) to the value of the count CNT. Initially, the count CNT is equal to 0, and the output of the multiplier 603 is equal to 0. The value of the count CNT retained by the register 602 is supplied to the decoder 604. The select signal (corresponding to the value of the count CNT) output by the decoder 604 is supplied to the MUX 606 so that one of the phase-delayed clock signals is selected at the MUX 606. The selected phase-delayed clock signal is supplied from the MUX 606 to the sampler 23 of the data reproduction system.

The MPU at step S3 starts a test read operation in which the storage medium 200 is test read by the head 20 in the data reproduction system. The MPU at step S4 finds the number of read errors in the test read operation. The MPU at step S5 sets the internal register INT REG(CNT) whose register number is identified by the value of the count CNT, to the number of read errors. The MPU at step S6 increments the count CNT (CNT=CNT+1). The MPU at step S7 determines whether the value of the count CNT after the increment at the step S6 is below the maximum register number (CNT≦4).

When the condition CNT≦4 is met, the above steps S2 through S7 are repeated by the MPU. During the repeated execution of the steps S2 through S7, the output of the multiplier 603 which corresponds to the delay amount of the delay taps 605(1) through 605(5) is increased from the value "0" to the value "4X". Also, the value of the count CNT retained by the register 602 is increased from 0 to 4.

When the condition CNT≦4 at the step S7 is violated, the MPU at step S8 determines the register number of the internal register that contains the minimum error number among the internal registers INT REG(0) through INT REG(4). The MPU determines a delay factor, corresponding to the desired delay amount of the delay taps 605(1) through 605(n), by the register number which is obtained at the above step S8. The resulting delay factor is supplied from the MPU to the register 602 of the CPA 60 such that the CPA 60 can suitably adjust the phase of the clock signal by selecting one of the phase-delayed clock signals at the MUX 606.

According to the above-described delay factor determination procedure of FIG. 12, the data reproduction system can carry out the sampling of the readout signal by using the phase-delayed clock signal that is selected to minimize the number of possible read errors.

If the delay factors, which are determined through the delay factor determination procedure for respective portions of the storage medium 200 and are to be supplied to the register 602 of the CPA 60, are stored in a non-volatile memory, the readout action can be very quickly performed by the data reproduction system at the second or subsequent attempts with no need for clock phase adjustment.

In the above-described embodiment, it is assumed that the CPA 60 contains only the five delay taps. However, it would be obvious that the number of the delay taps contained in the CPA 60 is increased to a larger number, and a corresponding number of the internal registers for such delay taps are used. In such a case, by performing the above-described delay factor determination procedure of FIG. 12, the data reproduction system can carry out the sampling of the readout signal by using the phase-delayed clock signal that is selected to minimize the number of possible read errors.

The present invention is not limited to the above-described embodiments, and variations and modifications may be made without departing from the scope of the present invention.

Further, the present invention is based on Japanese priority application No. 11-39,113, filed on Feb. 17, 1999, the entire contents of which are hereby incorporated by reference.

What is claimed is:

1. A clock matching apparatus which supplies a clock signal to a sampler of a data reproduction system so that a readout signal obtained from a storage medium is sampled periodically at sampling instants synchronized with the clock signal, in order to recover written information in the data reproduction system, including:

a phase error detection unit which detects a phase error of the clock signal based on the samples of the readout signal output by the sampler; and a phase-locked loop which supplies a phase-matched clock signal to the sampler by compensating for the phase error detected by the phase error detection unit, the phase error detection unit comprising:

an edge detection unit which detects a sampling instant for an edge sample among the samples of the readout signal; and a difference unit which generates a difference in timing phase between the edge sample and a sync level, the sync level being a reference signal level corresponding to a level of the readout signal at the sampling instants thereof and defined based on a partial-response waveform, the difference in the timing phase being output to the phase-locked loop as the detected phase error.

2. The clock matching apparatus according to claim 1, wherein the edge detection unit detects a sampling instant for a rising-edge sample among the samples of the readout signal.

3. The clock matching apparatus according to claim 1, wherein the edge detection unit detects a sampling instant for a trailing-edge sample among the samples of the readout signal.

4. The clock matching apparatus according to claim 1, wherein the edge detection unit detects a sampling instant for a rising-edge sample among the samples and a sampling instant for a trailing-edge sample among the samples.

5. The clock matching apparatus according to claim 4, wherein the difference unit generates a first difference in the timing phase between the rising-edge sample and the sync level and a second difference in the timing phase between the trailing-edge sample and the sync level, and wherein the phase error detection unit further comprises an output selection unit which outputs selected one of the first difference or the second difference to the phase-locked loop as the detected phase error.

6. The clock matching apparatus according to claim 1, wherein, when a preceding one of the samples is outside a range of the signal level between the sync level and a decision level but a current one of the samples is within the range, the edge detection unit detects the current sample as being the edge sample.

7. The clock matching apparatus according to claim 3, wherein, when the level of the readout signal is decreasing and one of the samples just falls within a range of the signal level between a first decision level and a second decision level with the sync level centered, the edge detection unit detects said sample as being the trailing-edge sample.

8. The clock matching apparatus according to claim 2, wherein, when the level of the readout signal is increasing and one of the samples just falls within a range of the signal level between a first decision level and a second decision level with the sync level centered, the edge detection unit detects said sample as being the rising-edge sample.

9. The clock matching apparatus according to claim 1, wherein the phase error detection unit further comprises an offset correction unit which estimates an offset of the readout signal level based on the samples output by the sampler, the offset correction unit generating corrected reference levels based on the offset, and outputting the corrected reference levels to the edge detection unit.

10. The clock matching apparatus according to claim 6, wherein the phase error detection unit further comprises an offset correction unit which estimates an offset of the readout signal level based on the samples output by the sampler, the offset correction unit generating corrected reference levels based on the offset, and outputting the corrected reference levels to the edge detection unit.

11. The clock matching apparatus according to claim 7, wherein the phase error detection unit further comprises an offset correction unit which estimates an offset of the readout signal level based on the samples output by the sampler, the offset correction unit generating corrected reference levels based on the offset, and outputting the corrected reference levels to the edge detection unit, the corrected reference levels including at least the sync level and the first and second decision levels.

12. The clock matching apparatus according to claim 1, further comprising a clock phase adjustment unit which adjusts the phase of the clock signal output by the phase-locked loop such that the resulting clock signal adequately suits the sampling of the readout signal at upper peaks or lower peaks thereof.

13. The clock matching apparatus according to claim 12, wherein the clock phase adjustment unit includes a plurality of delay taps and a multiplexer, the plurality of delay taps being connected in series and having outputs connected to the multiplexer in parallel, the multiplexer being connected to the sampler, and the clock signal output by the phase-locked loop being supplied to one of the plurality of delay taps.

14. The clock matching apparatus according to claim 13, wherein the timing phase of the clock signal supplied by the phase-locked loop is delayed by each of the plurality of delay taps, and the phase-delayed clock signals are supplied from the plurality of delay taps to the multiplexer, and wherein one of the phase-delayed clock signals is selected at the multiplexer in accordance with a select signal so that the selected phase-delayed clock signal is supplied from the multiplexer to the sampler.

15. The clock matching apparatus according to claim 13, wherein the clock phase adjustment unit is configured such that a total delay amount of the plurality of delay taps is equal to a sampling interval between the sampling instants at the sampler.

* * * * *